(12) United States Patent
Horiuchi et al.

(10) Patent No.: US 10,531,339 B2
(45) Date of Patent: Jan. 7, 2020

(54) RESOURCE ALLOCATION METHOD FOR SHARED BASE STATION

(71) Applicant: Panasonic Intellectual Property Corporation of America, Torrance, CA (US)

(72) Inventors: Ayako Horiuchi, Kanagawa (JP); Takashi Tamura, Kanagawa (JP); Koji Yamamoto, Kyoto (JP); Tomohiko Mimura, Tokyo (JP)

(73) Assignee: PANASONIC INTELLECTUAL PROPERTY CORPORATION OF AMERICA, Torrence, CA (US)

( * ) Notice: Subject to any disclaimer, the term of this patent is extended or adjusted under 35 U.S.C. 154(b) by 73 days.

(21) Appl. No.: 14/432,667

(22) PCT Filed: Sep. 25, 2013

(86) PCT No.: PCT/JP2013/005663
§ 371 (c)(1),
(2) Date: Mar. 31, 2015

(87) PCT Pub. No.: WO2014/054244
PCT Pub. Date: Apr. 10, 2014

(65) Prior Publication Data
US 2015/0257039 A1     Sep. 10, 2015

(30) Foreign Application Priority Data
Oct. 5, 2012  (JP) .................................. 2012-223117

(51) Int. Cl.
*H04W 28/16* (2009.01)
*H04L 5/00* (2006.01)
(Continued)

(52) U.S. Cl.
CPC ........... *H04W 28/16* (2013.01); *H04L 5/0037* (2013.01); *H04W 72/048* (2013.01); *H04W 16/14* (2013.01)

(58) Field of Classification Search
CPC ... H04L 5/0032; H04L 5/0035; H04L 5/0037; H04L 5/0039; H04L 5/0041;
(Continued)

(56) References Cited

U.S. PATENT DOCUMENTS 6,956,849 B1 * 10/2005 Yip ........................ H04L 47/39
370/359
2006/0183502 A1    8/2006 Jeong et al.
(Continued)

FOREIGN PATENT DOCUMENTS

EP    1475980 A1    11/2004
EP    1729532 A1    12/2006
(Continued)

OTHER PUBLICATIONS

Supplementary European Search Report for Application No. 13844117.5 dated Aug. 26, 2015.
(Continued)

*Primary Examiner* — Khoa Huynh
(74) *Attorney, Agent, or Firm* — Pearne & Gordon LLP

(57) ABSTRACT

In this device: a gain calculator (101) uses a function in which the variable is a first resource amount from among the resource amounts possessed by an operator in question, and calculates a second resource amount at which the maximum gain is reached in the function of the operator to which the device in question belongs, the first resource amount being a resource amount allocated to a terminal belonging to another operator; a transmitter/receiver (102) transmits the second resource amount to the manager (300), and receives, from the manager (300), the minimum value among second
(Continued)

resource amounts calculated in each of the operators; and the allocation unit (103) allocates resources to the signal of the terminal belonging to the operator in question and to the terminal belonging to the other operator on the basis of the minimum value among the second resource amounts calculated by each of the operators.

14 Claims, 11 Drawing Sheets

(51) Int. Cl.
*H04W 72/04* (2009.01)
*H04W 16/14* (2009.01)

(58) Field of Classification Search
CPC .... H04L 5/0067; H04L 5/0073; H04W 16/02; H04W 16/10; H04W 16/14; H04W 28/16; H04W 28/20; H04W 72/048; H04W 72/0493; H04W 72/06
See application file for complete search history.

(56) References Cited

U.S. PATENT DOCUMENTS

2013/0163508 A1* 6/2013 Yu .................... H04W 16/14
370/315

2013/0310056 A1* 11/2013 Cabrera .................. H04W 4/00
455/450

FOREIGN PATENT DOCUMENTS

| EP | 2083591 A1 | 7/2009 | |
|---|---|---|---|
| GB | 2469465 A * | 10/2010 | ........ H04W 72/1231 |
| JP | 2006-174447 A | 6/2006 | |
| WO | 02/023758 A1 | 3/2002 | |

OTHER PUBLICATIONS

Salman A Alqahtani, et al., "Simulation Based Study of Adaptive Rate Scheduling for Multi-Operator 3G Mobile Wireless Networks", IEEEVTS Vehicular Technology Conference. Proceedings, IEEE, US, Apr. 1, 2007, pp. 1209-1213, ISBN: 978-1-4244-0266-3, System Model and Assumptions; p. 1210, right-hand column, paragraph II, Proposed M-CDGPS Schemes, p. 1210, paragraph III-p. 1212, XP031092821.
International Search Report for Application No. PCT/JP2013/005663 dated Dec. 24, 2013.
Tomohiko Mimura, et al., "Effect of Dynamic Spectrum Allocation for Multi-Operator Mobile Relay Node", IEICE Technical Report, Jan. 19, 2012 (Jan. 19, 2012), vol. III, No. 404, pp. 251 to 256.
Tomohiko Mimura, et al., "Multi-Operator Mobile Relaying Effect of Shared Spectrum Allocation", Graduate School of Informatics, Kyoto University, Sep. 2012, pp. 1268 to 1272.

* cited by examiner

OPERATOR 1
FREQUENCY BAND 1

OPERATOR 2
FREQUENCY BAND 2

OPERATOR 1&2
FREQUENCY BAND 3

RESOURCE ALLOCATION METHOD FOR SHARED BASE STATION

TECHNICAL FIELD

The present invention relates to a communication apparatus, a management apparatus, a resource allocation method and a resource determination method.

BACKGROUND ART

In recent years, with the progress in development of multimedia information, the transmission of not only audio data but also large-volume data such as still image data and moving image data has become common in cellular mobile communication systems. In LTE-Advanced (Long Term Evolution Advanced), in order to achieve large-volume data transmission, active studies have been carried out on techniques for achieving a high transmission rate using a broad radio band, a MIMO (Multiple-Input Multiple-Output) transmission technique and an interference control technique.

LTE-Advanced aims at high speed downlink communication using a maximum of 1 Gbps and thus requires a communication system that achieves a high throughput and is excellent in frequency utilization efficiency. LTE-Advanced promotes implementation of a high throughput cellular network and improvement of frequency utilization efficiency in the cellular network.

In order to improve frequency utilization efficiency, studies are being carried out on installation of a base station having a small cell radius called "picocell" (which may also be called "pico base station") within a coverage area of a base station having a large cell radius called "macrocell" (which may also be called "macro base station") (e.g., see FIG. 1A). However, although frequency utilization efficiency improves with the installation of the picocell, if the macrocell and the picocell have the same frequency band, the interference that the picocell receives from the macrocell becomes problematic. Studies are being carried out on setting an ABS (Almost Blank Subframe) which is a subframe that limits transmission of the macrocell to limit interference that the picocell receives. A subframe set as an ABS in the macrocell is called "protected subframe" and a subframe not set as an ABS in the macrocell is called "non-protected subframe in the picocell (see FIG. 1B). In the protected subframe, channel quality of the picocell improves.

Meanwhile, attention is being focused on network sharing in which a network is shared by a plurality of operators to reduce installation cost (e.g., see PTL 1 and NPL 1). With network sharing, equipment such as a base station (eNB) or the like or frequency band is shared among operators. Network sharing is expected to enable active and efficient use of finite resources such as the frequency band.

CITATION LIST

Patent Literature

PTL 1
Japanese Patent Application Laid-Open No. 2006-174447
Non-Patent Literature
NPL 1
Multi-Operator Mobile Relaying: Effect of Shared Spectrum Allocation, Personal, Indoor and Mobile Radio Communications (PIMRC) September 2012

SUMMARY OF INVENTION

Technical Problem

As described above, although the installation of a picocell can improve throughput in the area of the picocell, a plurality of operators individually installing picocells will not only cause a demerit in view of the installation space but also an increase in equipment cost, which is not efficient. Particularly areas such as a railroad or underground shopping arcade where the installation space is limited require a reduction in the number of picocells to be installed. Thus, a network sharing technique may be applied to a picocell so that the picocell may be shared among a plurality of operators. However, when the picocell is shared among a plurality of operators, the use of the picocell among operators needs to be adjusted (resource allocation of the picocell or the like), but such an adjustment method has not been sufficiently studied.

An object of the present invention is to provide a communication apparatus, a management apparatus, a resource allocation method and a resource determination method capable of appropriately adjusting the use of a picocell among a plurality of operators when a network sharing technique is applied to the picocell.

Solution to Problem

As has been described above, a communication apparatus according to an aspect of the present invention includes: a calculation section that calculates, using a function that uses a first resource amount or a first number of terminals as a variable, a second resource amount corresponding to a maximum gain in the function of an operator to which the communication apparatus belongs or a second number of terminals corresponding to the maximum gain in the function of the operator, the first resource amount being a resource amount allocated from among a resource amount held by the operator to a terminal belonging to another operator, the first number of terminals being a number of terminals connected to a picocell belonging to the other operator among terminals belonging to the operator of the communication apparatus; a transmitting and receiving section that transmits the second resource amount or the second number of terminals to a management apparatus and that receives, from the management apparatus, a minimum value of a plurality of the second resource amounts or a minimum value of a plurality of the second numbers of terminals calculated in each of a plurality of operators; and an allocation section that allocates a resource to a signal of the terminal belonging to the operator and the terminal belonging to the other operator based on the minimum value of the plurality of second resource amounts or the minimum value of the plurality of the second numbers of terminals.

Moreover, a management apparatus according to an aspect of the present invention includes: a receiving section that receives, from each of a plurality of operators, in a function that uses a first resource amount or a first number of terminals as a variable, a second resource amount corresponding to a maximum gain in the function, or a second number of terminals corresponding to the maximum gain in the function, the first resource amount being a resource amount allocated from among a resource amount held by the operator to a terminal belonging to another operator, the first number of terminals being a number of terminals connected to a picocell belonging to the other operator among terminals belonging to the operator; a determining section that determines a minimum value of a plurality of the second resource amounts or a minimum value of a plurality of the second the numbers of terminals received from each of the plurality of operators; and a transmitting section that transmits a minimum value of the plurality of second resource amounts or a minimum value of the plurality of the second numbers of terminals to the plurality of operators.

Moreover, a resource allocation method according to an aspect of the present invention includes: calculating, using a function that uses a first resource amount or a first number of terminals as a variable, a second resource amount corresponding to a maximum gain in the function of an operator or a second number of terminals corresponding to the maximum gain in the function of the operator, the first resource amount being a resource amount allocated from among a resource amount held by the operator to a terminal belonging to another operator, the first number of terminals being a number of terminals connected to a picocell belonging to the other operator among terminals belonging to the operator; transmitting the second resource amount or the second number of terminals to a management apparatus and receiving a minimum value of a plurality of the second resource amounts or a minimum value of a plurality of the second numbers of terminals calculated in each of a plurality of operators from the management apparatus; and allocating a resource to a signal of the terminal belonging to the operator and the terminal belonging to the other operator based on the minimum value of the plurality of second resource amounts or the minimum value of the plurality of the second numbers of terminals.

A resource determination method according to according to an aspect of the present invention includes: receiving, from each of a plurality of operators, in a function that uses a first resource amount or a first number of terminals as a variable, a second resource amount corresponding to a maximum gain in the function or a second number of terminals corresponding to the maximum gain in the function, the first resource amount being a resource amount allocated from among a resource amount held by the operator to a terminal belonging to another operator, the first number of terminals being a number of terminals connected to a picocell belonging to the other operator among terminals belonging to the operator; determining a minimum value of a plurality of the second resource amounts or a minimum value of a plurality of the second numbers of terminals received from each of the plurality of operators; and transmitting a minimum value of the plurality of second resource amounts or a minimum value of the plurality of the second numbers of terminals to the plurality of operators.

Advantageous Effects of Invention

According to the present invention, when a network sharing technique is applied to a picocell, it is possible to appropriately adjust the use of the picocell among a plurality of operators.

DESCRIPTION OF EMBODIMENTS

Figure 1:
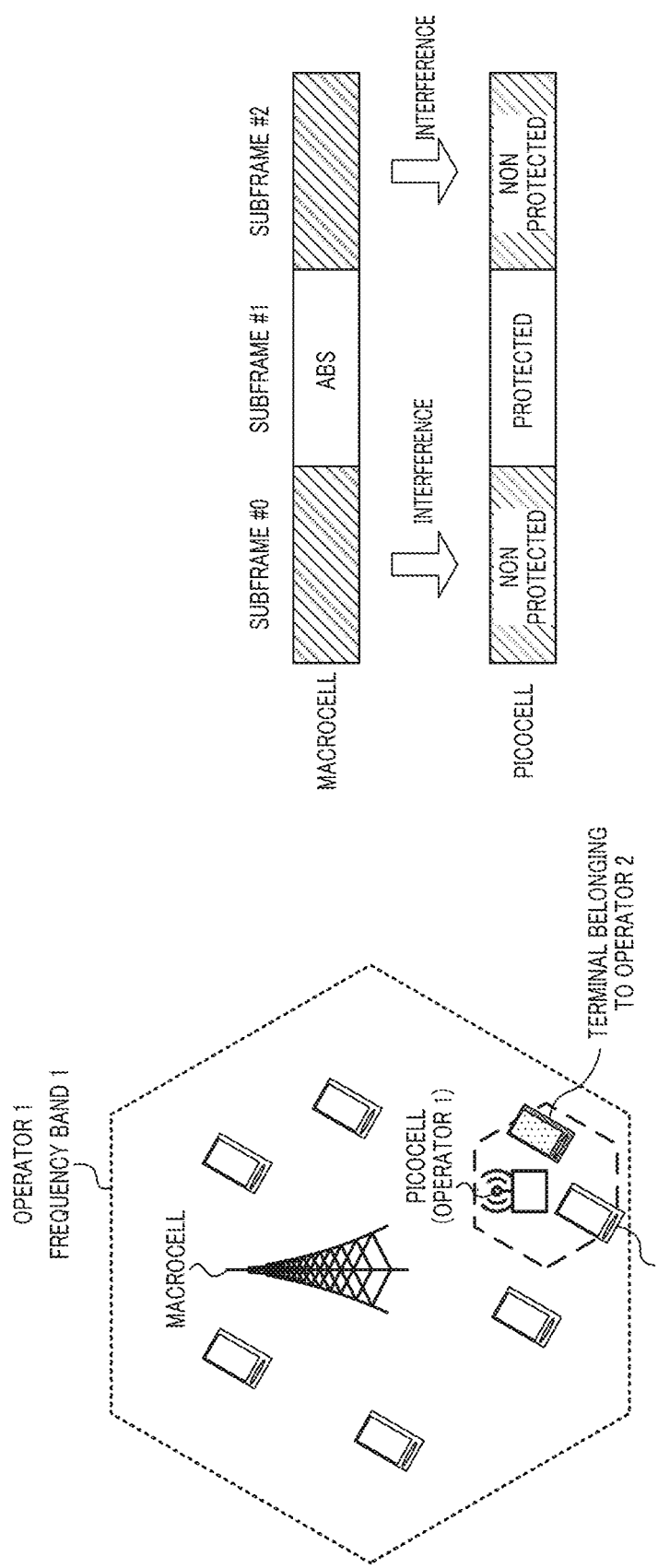
FIGS. 1A and 1B illustrate an example of network sharing and ABS setting.

Hereinafter, embodiments of the present invention will be described in detail with reference to the accompanying drawings. Throughout the embodiments, the same elements are assigned the same reference numerals and any duplicate description of the elements is omitted.

Embodiment 1

Overview of System

A system according to the present embodiment includes a communication apparatus and a management apparatus. For example, the communication apparatus is base station (which may also be called "eNB") 100 and the management apparatus is manager 300. The system according to the present embodiment includes a plurality of operators, and each operator includes base station 100 and base station 200. For example, base station 100 is a macrocell and base station 200 is a picocell. The macrocell and the picocell are operated in a frequency band set for each operator.

Each picocell belonging to a region of a corresponding one of macrocells covered by a plurality of operators is shared among the plurality of operators (network sharing). More specifically, the resources of a picocell belonging to a certain operator can also be allocated to a terminal belonging to another operator.

Base station 100 (macrocell) of each operator is connected to manager 300. Manager 300 adjusts the use (sharing) of the picocell among operators. More specifically, manager 300 determines the resource amount to be allocated to a terminal belonging to another operator in a picocell belonging to each operator.

Figure 2:
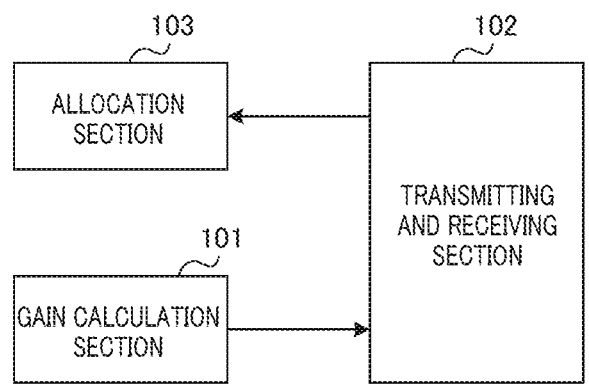
FIG. 2 is a block diagram illustrating a main configuration of a base station according to Embodiment 1 of the present invention.

FIG. 2 is a block diagram illustrating a main configuration of base station 100 according to the present embodiment.

In base station 100, using a function (gain function) using, as a variable, a first resource amount allocated to a terminal belonging to another operator among the resources of the operator to which base station 100 belongs (hereinafter, referred to as "host operator"), gain calculation section 101 calculates a second resource amount corresponding to a maximum gain in the function of the host operator. Transmitting and receiving section 102 transmits the above-described second resource amount to manager 300 and receives a minimum value of a plurality of second resource amounts calculated in each of the plurality of operators from manager 300. Allocation section 103 allocates resources to signals of terminals belonging to the host operator and signals of terminals belonging to other operators based on a minimum value of the plurality of second resource amounts.

Figure 3:
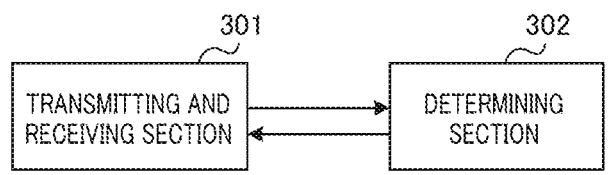
FIG. 3 is a block diagram illustrating a main configuration of a manager according to Embodiment 1 of the present invention.

FIG. 3 is a block diagram illustrating a main configuration of manager 300 according to the present embodiment.

In manager 300, transmitting and receiving section 301 receives a second resource amount corresponding to a maximum gain in a function (gain function) using, as a variable, a first resource amount allocated to a terminal belonging to another operator of the resource amounts of the host operator from each of the plurality of operators. Determining section 302 determines a minimum value of the plurality of second resource amounts received from of the plurality of operators, respectively. Transmitting and receiving section 301 transmits a minimum value of the plurality of second resource amounts to the plurality of operators.

Note that the above-described gain function is a function common among the plurality of operators representing a gain of each of the plurality of operators sharing the picocells belonging to regions of the macrocells covered by the plurality of operators and includes only one extreme value. In the above-described gain function, a third resource amount allocated to the terminal belonging to the host operator of the resource amounts of another operator satisfies a proportional relationship with the first resource amount.

Configuration of Base Station 100

Figure 4:
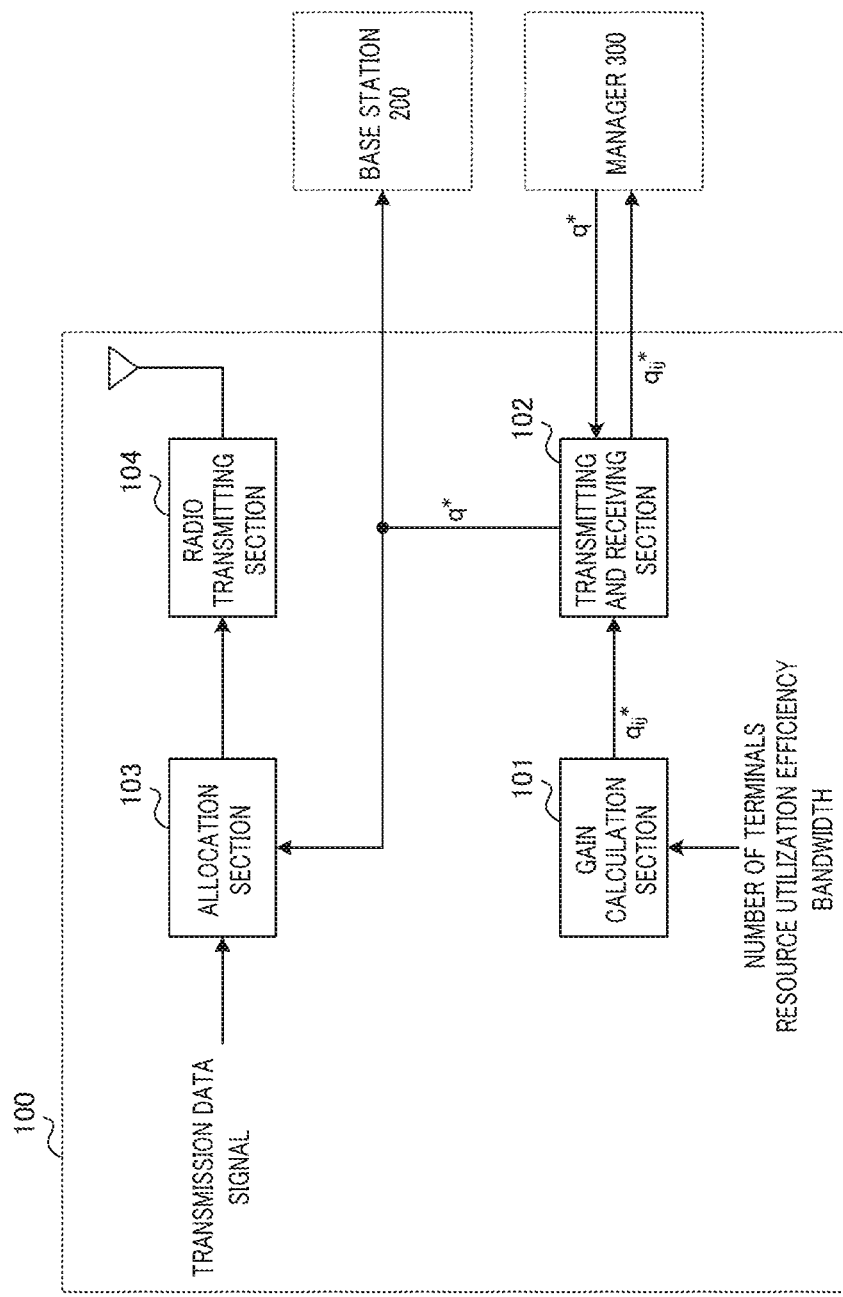
FIG. 4 is a block diagram illustrating a configuration of a base station (macrocell) according to Embodiment 1 of the present invention.

FIG. 4 is a block diagram illustrating a configuration of base station 100 (macrocell) according to the present embodiment.

In FIG. 4, parameters such as the number of terminals (the number of terminals connected to the macrocell, the number of terminals connected to the picocell), resource utilization efficiency and bandwidth are inputted to gain calculation section 101. Gain calculation section 101 stores a gain function indicating a gain for each operator beforehand. Here, the gain function is common among operators sharing the picocell and is defined by the above-described parameters for each operator. The gain function of each operator is a function having one extreme value (that is, local maximum value). In the present embodiment, the gain function returns a gain of operator i (e.g., throughput) using as one of variables, the resource amount $q_{ij}$ allocated to a terminal belonging to another operator (operator j) of the resource amount of the host operator (operator i) in each operator. Resource amount $q_{ij}$ is a value in a range of $0 \leq q_{ij} \leq R_i$ ($R_i$: resource amount of operator i (e.g., frequency bandwidth)). Gain calculation section 101 calculates a resource amount (hereinafter represented by "$q_{ij}*$") corresponding to a maximum gain in the gain function using the received number of terminals, resource utilization efficiency and bandwidth. Gain calculation section 101 outputs resource amount $q_{ij}*$ to transmitting and receiving section 102.

Transmitting and receiving section 102 performs transmission/reception processing on signaling between base station 100 and manager 300, and between base station 100 and base station 200 (picocell). More specifically, transmitting and receiving section 102 transmits signaling including resource amount $q_{ij}*$ (declared value) received from gain calculation section 101 to manager 300. Transmitting and receiving section 102 also receives signaling including resource amount q* determined in manager 300 (report value or may also be referred to as "resource sharing information," to be described later in detail). Transmitting and receiving section 102 transmits received resource amount q* to base station 200 (picocell) belonging to the own operator and also outputs resource amount q* to allocation section 103. Here, transmission and reception of signaling between transmitting and receiving section 102 and manager 300 and between transmitting and receiving section 102 and base station 200 may be performed via, for example, a wired network such as an X2 interface or S1 interface, or by radio.

Allocation section 103 allocates a resource to a transmission data signal intended for a terminal (which may also be referred to as "UE") of the host operator based on of resource amount q* received from transmitting and receiving section 102. For example, allocation section 103 allocates a resource to the transmission data signal intended for each terminal so that the resource amount allocated to the terminal of the host operator becomes an average ($R_i$−q*). Base station 100 assumes resources in a protected subframe in the picocell (hereinafter may also be referred to as "protected resources") as resources to be allocated to terminals belonging to other operators and does not allocate the resources to the terminal belonging to the host operator for the protected resources. Allocation section 103 outputs the transmission data signal allocated to each resource to radio transmitting section 104.

Radio transmitting section 104 applies radio transmission processing such as up-conversion to the transmission data signal received from allocation section 103 and transmits the transmission data signal to each terminal via an antenna.

Configuration of Base Station 200

Figure 5:
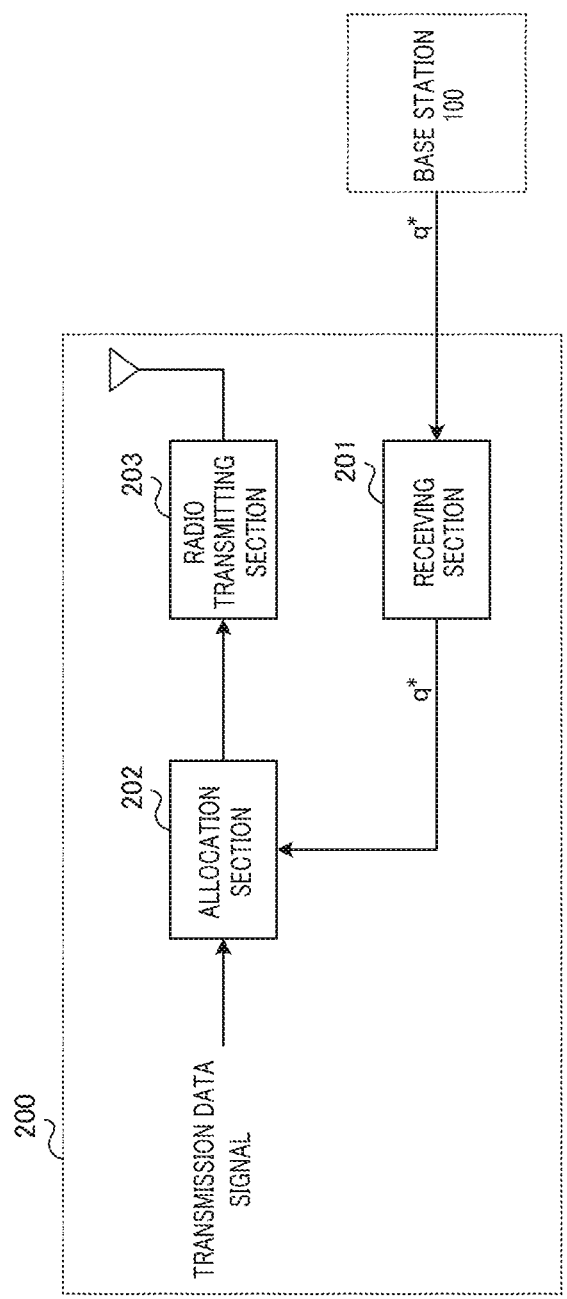
FIG. 5 is a block diagram illustrating a configuration of a base station (picocell) according to Embodiment 1 of the present invention.

FIG. 5 is a block diagram illustrating a configuration of base station 200 (picocell) according to the present embodiment. Base station 200 is placed in the coverage area of base station 100 belonging to the same operator as that of base station 200 and operated in the same frequency band (e.g., see FIG. 1A).

In FIG. 5, receiving section 201 receives resource amount q* (resource amount allocated to the terminal belonging to the other operator) via, for example, an X2 interface or S1 interface from base station 100 (macrocell) and outputs resource amount q* to allocation section 202. When a direct interface exists between receiving section 201 and manager 300, receiving section 201 may directly receive resource amount q* from manager 300 without base station 100.

Allocation section 202 allocates resources to a transmission data signal intended for the terminal of the host operator based on resource amount q* received from receiving section 201 and also allocates resources to transmission data signals intended for terminals belonging to other operators. For example, allocation section 202 allocates resources to a transmission data signal intended for each terminal so that the resource amount allocated to the terminal of the host operator becomes an average ($R_i$−q*) and the resource amounts allocated to terminals belonging to other operators becomes q*. Allocation section 202 outputs the transmission data signal allocated to each resource to radio transmitting section 203.

Radio transmitting section 203 applies radio transmission processing such as up-conversion to the transmission data signal received from allocation section 202 and transmits the transmission data signal to each terminal via an antenna.

Configuration of Manager 300

Figure 6:
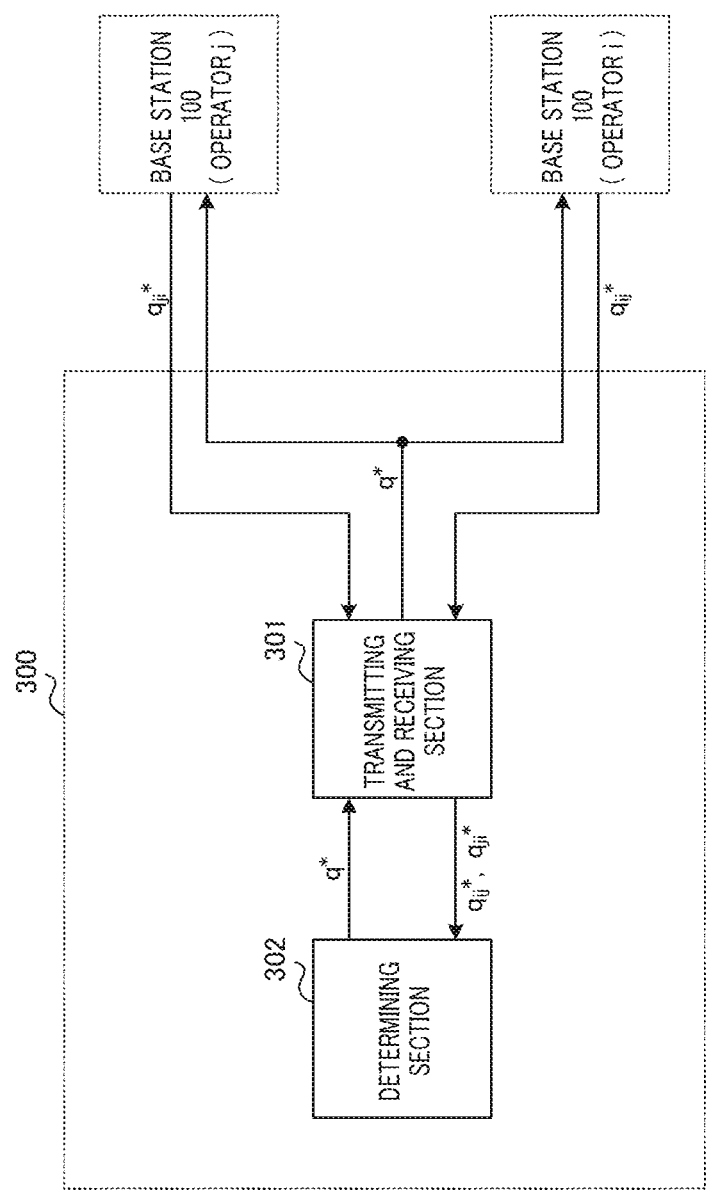
FIG. 6 is a block diagram illustrating a configuration of the manager according to Embodiment 1 of the present invention.

FIG. 6 is a block diagram illustrating a configuration of manager 300 according to the present embodiment. Manager 300 is connected to base stations 100 of a plurality of operators (operator i, j in FIG. 6) via, for example, an X2 interface or S1 interface.

For example, functions of manager 300 may be provided in an MME (Mobility Management Entity). The MME is a logical node that performs a setting/release of packet connections, and handover control or the like.

In FIG. 6, transmitting and receiving section 301 performs transmission/reception processing on signaling with base stations 100 of the respective operators. More specifically, transmitting and receiving section 301 receives signaling including the resource amounts (declared values $q_{ij}^*$ and $q_{ji}^*$) calculated in gain calculation section 101 of base station 100 of each operator i, j from each operator. Transmitting and receiving section 301 transmits signaling including resource amount q* (report value, resource sharing information) determined in determining section 302, which will be described later, to base station 100 of each operator i, j.

Determining section 302 determines a minimum value of the resource amounts ($q_{ij}^*$ and $q_{ji}^*$) of the plurality of operators received from transmitting and receiving section 301 as resource amount q* to be allocated to a terminal belonging to another operator in a picocell of each operator. That is, the resource amounts (q*) allocated to terminals belonging to other operators in the picocells of the respective operators are common among the operators. Determining section 302 outputs determined resource amounts q* to transmitting and receiving section 301.

Operations of Base Station 100, Base Station 200 and Manager 300

Operations of base station 100, base station 200 and manager 300 having the above-described configurations will be described.

A case will be described below as an example where two operators of operator 1 and operator 2 share picocells belonging to the respective operators.

When sharing a picocell among operators, a resource allocation method in the picocell will be studied which takes into consideration that allocating resources to terminals belonging to other operators will not cause the gain of the host operator to deteriorate.

As shown in following equation 1, the product $f_i$ of throughputs of terminals belonging to operator i (i=1 in equation 1) is defined as the gain function representing the gain of operator i.

(Equation 1)

$$f_1(q_{12}, q_{21}, p_1) = \left(\frac{r_{macro}(R_1 - q_{12})(1 - p_1)}{N_1}\right)^{N_1} \cdot \left(\frac{(r_{protected} p_1 + r_{n\_protected}(1 - p_1))(R_1 - q_{12})}{M_{11}}\right)^{M_{11}} \cdot \left(\frac{r_{protected} q_{21}}{M_{21}}\right)^{M_{21}}$$ [1]

In equation 1, $N_i$ denotes the number of terminals connected to a macrocell of operator i, $M_{ii}$ denotes the number of terminals connected to a picocell of operator i among terminals belonging to operator i, $M_{ji}$ denotes the number of terminals connected to a picocell of operator j among terminals belonging to operator i, $R_i$ denotes a resource amount (e.g., bandwidth) held by operator i, $r_{macro}$ denotes average resource utilization efficiency of the macrocell, $r_{protected}$ denotes average resource utilization efficiency of protected resources in a picocell, $r_{n\_protected}$ denotes average resource utilization efficiency of resources in non-protected subframes of the picocell (hereinafter may also be referred to as "non-protected resources"), $p_i$ denotes a ratio of protected resources to the resources allocated to terminals belonging to operator i in operator i, $q_{ij}$ denotes the resource amounts allocated to terminals belonging to operator j in operator i (where, $q_{ij}$ are all protected resources) and $q_{ji}$ denotes the resource amounts allocated to terminals belonging to, operator i in operator j (where, $q_{ji}$ are all protected resources). Note that i and j are any given integers, and when i=1 and j=2 in equation 1, i and j represent the gain function of operator 1. When i=2 and j=1, i and j can represent the gain function of operator 2 (which will be omitted here).

Here, suppose that each operator takes on a "strategy" to maximize each gain function (gain function shown in equation 1 in the case of operator i). In this case, since two operators perform resource allocation individually, this problem setting can be assumed as a non-cooperative game in strategic form with two players in which operators are considered as players according to a game theory. However, the solution of the game becomes Nash equilibrium ($q_{12}$, $q_{21}$)=(0, 0). The Nash equilibrium is a combination of strategies whereby any player (here, operator) cannot obtain any higher gain by changing the player's own strategy. Here, ($q_{12}$, $q_{21}$)=(0, 0) means that the resources of a picocell of the host operator in each operator are not allocated to terminals belonging to other operators. This is because whatever strategies ($0 \leq q_{ij} \leq R_i$) are taken by other operators, not allowing other operators to use the resources of the picocell of the host operator will maximize the gain function of the host operator. However, the strategy of setting ($q_{12}$, $q_{21}$)=(0, 0) causes gains (throughputs) of terminals belonging to the other operators connected to the host operator to become 0, which ends up becoming a strategy of reducing the gains of other operators.

In contrast, the present embodiment designs a system in which the resources of a picocell are flexibly allocated among operators. This system uses "individual rationality" and "strategy proof" as requirements.

Satisfying "individual rationality" prevents participation of a given operator in the system from leading to a reduced gain. That is, satisfying individual rationality makes it possible to avoid disadvantages even when the operator participates in the system.

By satisfying "strategy proof," a given operator needs only to declare a desired solution, which eliminates motives of taking a strategic action such as false declaration. That is, satisfying strategy proof eliminates the necessity to take action for false declaration and makes the system design easier.

Thus, in the present embodiment, the gain function is designed so that a mechanism design exchange economic model is applicable to sharing of a picocell among operators. Here, it has been proven in the exchange model that the only exchange rule that satisfies individual rationality and strategy proof is "fixed proportional exchange rule." Thus, in order to apply a fixed proportional exchange rule to allocation of resources to be shared among operators, in the present embodiment, each operator secures the same resource amount ($q_{12}=q_{21}$) for allocation of terminals belonging to other operators. That is, the ratio between the resource amount allocated to terminals belonging to other operators to the resource amount held by the host operator and the resource amount allocated to the terminals belonging to the host operator to the resource amount held by the host operator to the other operators (exchange rate between operators) is one-to-one (identical).

When the resource amounts secured in the respective operators for allocation of terminals belonging to other operators are identical ($q_{12}=q_{21}$), gain function $f_1$ of operator 1 and gain function $f_2$ of operator 2 are defined by equation 2 and equation 3 respectively.

(Equation 2)
$$f_1(q_{12}, p_1) = \left(\frac{r_{macro}(R_1 - q_{12})(1 - p_1)}{N_1}\right)^{N_1} \cdot$$
$$\left(\frac{(r_{protected}p_1 + r_{n\_protected}(1 - p_1))(R_1 - q_{12})}{M_{11}}\right)^{M_{11}} \cdot$$
$$\left(\frac{r_{protected}q_{21}(=q_{12})}{M_{21}}\right)^{M_{21}}$$
$$= (R_1 - q_{12})^{N_1+M_{11}} q_{21}(=q_{12})^{M_{21}} g_1(p_1)$$
[2]

(Equation 3)
$$f_2(q_{21}, p_2) = \left(\frac{r_{macro}(R_2 - q_{21})(1 - p_2)}{N_2}\right)^{N_2} \cdot$$
$$\left(\frac{(r_{protected}p_2 + r_{n\_protected}(1 - p_2))(R_2 - q_{21})}{M_{22}}\right)^{M_{22}} \cdot$$
$$\left(\frac{r_{protected}q_{12}(=q_{21})}{M_{12}}\right)^{M_{12}}$$
$$= (R_2 - q_{21})^{N_2+M_{22}} q_{12}(=q_{21})^{M_{12}} g_2(p_2)$$
[3]

In equation 2 and equation 3, $g_1(p_1)$ and $g_2(p_2)$ are functions that collectively express portions not related to $q_{12}$ and $q_{21}$ respectively. By setting $q_{12}=q_{21}$, the gain functions shown in equation 2 and equation 3 become functions that have only one local maximum value for operator 1 and operator 2. Hereinafter, the solution that maximizes the gain function of operator 1 shown in equation 2 is expressed as $q_{12}^*$ and the solution that maximizes the gain function of operator 2 shown in equation 3 is expressed as $q_{21}^*$.

That is, gain calculation section 101 of base station 100 of each operator calculates, for each operator, the resource amounts of intended for terminals belonging to the other operators ($q_{ij}^*$ for operator i. $0 \leq q_{ij}^* \leq R_i$) which maximizes the gain function of each operator. More specifically, gain calculation section 101 of base station 100 of operator 1 or 2 calculates $q_{12}^*$ and $q_{21}^*$ that maximize the gain function shown in equation 2 and equation 3 based on equation 4 and equation 5 respectively.

(Equation 4)
$$\max_{p12} f_1(q_{12}, p_1) = \max_{p12}(R_1 - q_{12})^{N_1+M_{11}} q_{21}(=q_{12})^{M_{21}} g_1(p_1)$$
[4]

(Equation 5)
$$\max_{p21} f_2(q_{21}, p_2) = \max_{p21}(R_2 - q_{21})^{N_2+M_{22}} q_{12}(=q_{21})^{M_{12}} g_2(p_2)$$
[5]

Note that the gain function of each operator may be predefined before starting the system or may be indicated from manager 300 to base station 100 of each operator after starting the system. In addition, $q_{ij}^*$ calculated in each operator is transmitted to manager 300 as a declared value.

Manager 300 determines a minimum value of $q_{ij}^*$ (here, $q_{12}^*$ and $q_{21}^*$) received from base station 100 of each operator as resource amount $q^*$ common among the respective operators when a picocell is shared, to be secured for allocation of terminals belonging to other operators. That is, manager 300 adjusts the resource amount shared in the picocell so that the same resource amount ($q_{12}=q_{21}=q^*$) in each operator is secured for allocation of terminals belonging to other operators. Manager 300 indicates, to base station 100 of each operator, the determined resource amount $q^*$ as a report value (resource sharing information).

Base station 100 (allocation section 103) of each operator allocates resources to terminals belonging to the host operator based on $q^*$ received from manager 300. Base station 200 (allocation section 202) of each operator allocates resources to terminals belonging to the own operator based on $q^*$ received via base station 100 and also allocates resources to terminals belonging to other operators.

The reason that manager 300 determines the minimum value of $q_{ij}^*$ received from each operator as resource amount $q^*$ is that the gain function of each operator has only one local maximum value in $q_{ij}^*$. Setting the minimum value of $q_{ij}^*$ as resource amount $q^*$ makes it possible to satisfy individual rationality and strategy proof.

Figure 7B:
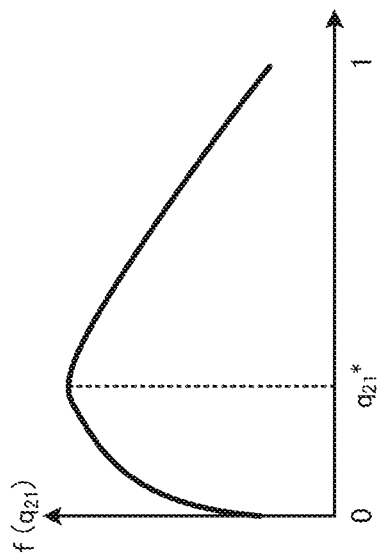
FIGS. 7A and 7B each illustrate an example of a gain function of each operator according to Embodiment 1 of the present invention.
Figure 7A:
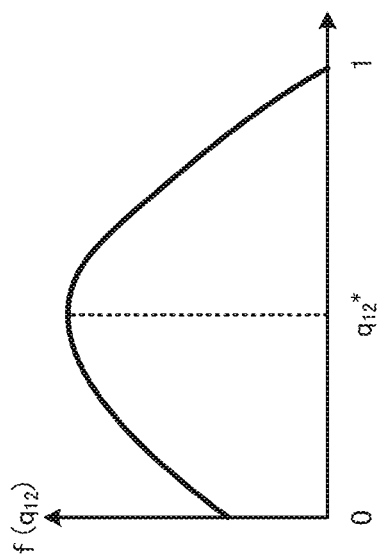

This will be described more specifically below. FIG. 7A illustrates gain function $f_1$ of operator 1 and FIG. 7B illustrates gain function $f_2$ of operator 2. FIGS. 7A and 7B show a relationship between resource amount $q_{ij}$ and gain $f_i(q_{ij})$. As shown in FIG. 7A and FIG. 7B, each gain function has only one local maximum value at $q_{12}^*$ and $q_{21}^*$. In FIG. 7A and FIG. 7B, suppose $q_{12}^* > q_{21}^*$. That is, manager 300 selects $q_{21}^*$ calculated by operator 2 as resource amount $q^*$.

<About Individual Rationality>

When operator i does not participate in the system according to the present embodiment, the gain (throughput) obtained by the gain function is a gain when $q_{ij}=0$. In contrast, by assuming the minimum value of $q_{12}^*$ and $q_{21}^*$ as resource amount $q^*$ (here $q_{21}^*$), the gain of each operator does not decrease compared to a case of no participation in the system ($q_{ij}=0$).

More specifically, when $q^* = q_{21}^*$, in FIG. 7B, a maximum gain ($f_2(q_{21}^*)$) is obtained in operator 2. Meanwhile, in FIG. 7A, $q_{21}^*$ exists in a range of $0 < q_{12} < q_{12}^*$. In the range of $0 < q_{12} < q_{12}^*$ in FIG. 7A, the gradient has a positive value. Thus, gain $f_1(q_{21}^*)$ is greater than gain ($f_1(0)$) when at least $q_{12}=0$ irrespective of the value of $q_{21}^*$. For this reason, although no maximum gain is obtained in operator 1 (FIG. 7A), a high gain can be obtained compared to a case of no participation in the system ($q_{ij}=0$).

As described above, according to the present system, individual rationality is satisfied by assuming the minimum value of $q_{ij}^*$ as resource amount $q^*$. That is, by assuming the minimum value of $q_{ij}^*$ as resource amount $q^*$, participation of a given operator in the system will not cause the gain to decrease. On the other hand, when a maximum value or average value of $q_{12}^*$ and $q_{21}^*$ is assumed to be resource amount $q^*$, the gain may decrease, and individual rationality is thereby not satisfied.

<About Strategy Proof>

When operator i declares (that is, false declaration) a value higher than $q_{ij}^*$ (value corresponding to the local maximum value of the gain function) to manager 300, and manager 300 determines the value as resource amount q*, the gain of operator i is lower than the gain in the case of $q_{ij}^*$. Similarly, when operator i declares (that is, false declaration) a value lower than $q_{ij}^*$ to manager 300, and manager 300 determines the value as resource amount q*, the gain of operator i is lower than the gain in the case of $q_{ij}^*$.

That is, since a minimum value of $q_{ij}^*$ of each operator is assumed to be resource amount q*, the gain of the own operator may not become a maximum depending on the value of $q_{ij}^*$ of the other operator, but it is optimum (best strategy) that each operator i declares $q_{ij}^*$ (that is, true declared value) to manager 300. That is, each operator need not change the strategy according to declared values of other operators.

As described above, by assuming the minimum value of $q_{ij}^*$ as resource amount q* as in the case of this system, there is no motive for a given operator to take strategic action such as false declaration, and thus, strategy proof is satisfied.

In contrast, when an average value of $q_{12}^*$ and $q_{21}^*$ is assumed to be resource amount q*, each operator can make an adjustment so that the above-described average value becomes a value corresponding to a local maximum value of the own gain function due to false declaration taking advantage that manager 300 does not know the true declared value (that is, so as to obtain a higher gain). In this case, there is a motive to take strategic action and strategy proof is not satisfied.

Signaling

Figure 8:
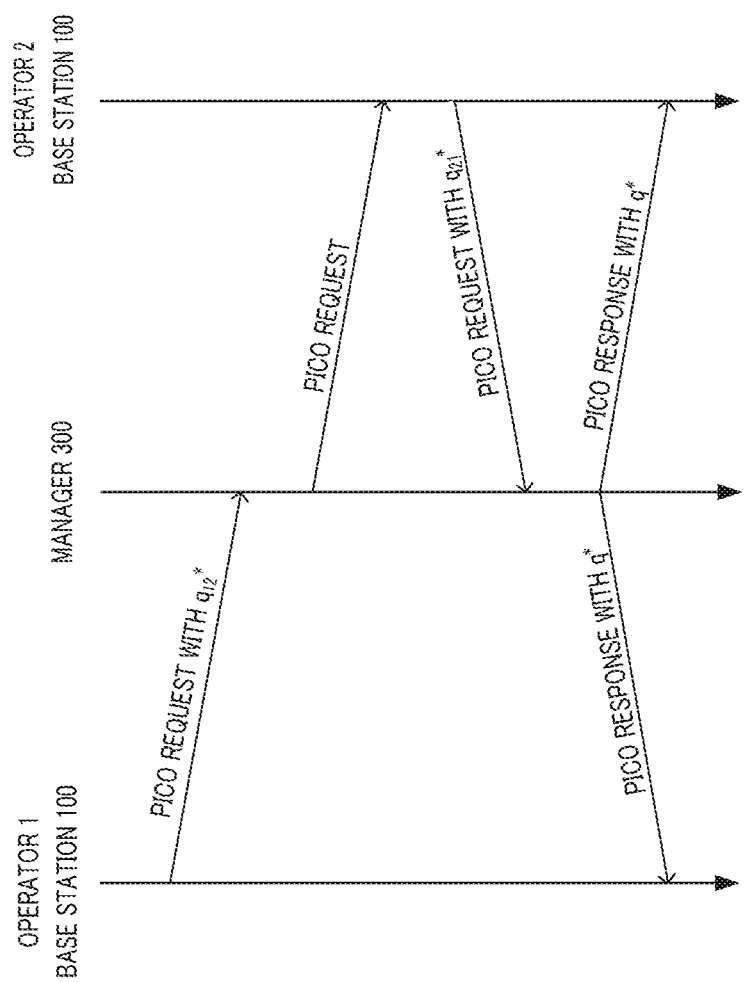
FIG. 8 illustrates an example of signaling according to Embodiment 1 of the present invention.

FIG. 8 illustrates transmission and reception of signaling between base station 100 of each operator (operators 1 and 2 in FIG. 8) and manager 300 according to the present embodiment. FIG. 8 illustrates a case where base station 100 of operator 1 requests sharing of a picocell with the other operator (operator 2).

(Step 1)
Base station 100 of operator 1 determines whether or not to share the picocell (base station 200) with operator 2. Alternatively, base station 100 of operator 1 determines whether or not to update a request (request for sharing the picocell) already indicated to manager 300.

(Step 2)
When base station 100 of operator 1 determines to share the picocell with operator 2 or determines to update the request already indicated to manager 300 in Step 1, base station 100 of operator 1 transmits signaling for requesting the sharing of the picocell (Pico Request) to manager 300. In this case, base station 100 of operator 1 includes resource amount $q_{12}^*$ acquired using the gain function of operator 1 in the signaling (Pico Request with $q_{12}^*$).

(Step 3)
Upon receiving the signaling for requesting the sharing of the picocell (Pico Request) from base station 100 of one operator (operator 1 in FIG. 8), manager 300 transmits signaling (Pico Request) for requesting base station 100 of the other operator (operator 2 in FIG. 8) to transmit the resource amount ($q_{21}^*$) that maximizes the gain of the gain function.

(Step 4)
Upon receiving the signaling for requesting the sharing of the picocell from manager 300 in step 3, base station 100 of other operator 2 calculates resource amount $q_{21}^*$ using the gain function and transmits signaling including the calculated resource amount $q_{21}^*$ (Pico Request with $q_{21}^*$) to manager 300.

(Step 5)
Upon receiving signaling from both operators in step 2 and step 4, manager 300 determines resource amount q* to be allocated to terminals belonging to other operators in a picocell of each operator based on the aforementioned method. That is, manager 300 determines a minimum value of two resource amounts $q_{12}^*$ and $q_{21}^*$ received from the two operators as resource amount q*.

(Step 6)
In step 5, manager 300 transmits signaling (Pico Response with q*) for starting/updating sharing of the picocell including determined resource amount q* (resource sharing information) to base stations 100 of both operators.

A case has been described in Step 3 where manager 300 indicates base station 100 of other operator 2 to transmit resource amount $q_{21}^*$. However, when manager 300 holds resource amount $q_{21}^*$ of other operator 2, the flow may transition to step 5 after completing the process in step 2.

Thus, in the present embodiment, base station 100 of each operator calculates resource amount ($q_{ij}^*$) corresponding to a maximum gain in the gain function of the host operator using a gain function ($f_i$) using as a variable, the resource amount ($q_{ij}$) allocated to terminals belonging to another operator (operator j) of the resource amount ($R_i$) held by the host operator (operator i) to which base station 100 belongs. Base station 100 allocates resources to signals of terminals belonging to the own operator and terminals belonging to other operators based on a minimum value (q*) of a plurality of resource amounts ($q_{ij}^*$) calculated in each of a plurality of operators.

By so doing, according to the present embodiment, when a network sharing technique is applied to a picocell, it is possible to appropriately adjust the use of a picocell among a plurality of operators.

Furthermore, in the present embodiment, the gain function is a function common among a plurality of operators and indicates respective gains of the plurality of operators that share each picocell, and has only one extreme value (one local maximum value). In the gain function, the resource amount allocated to the terminal belonging to the host operator among the resource amounts held by other operators satisfies a proportional relationship with the resource amounts allocated to the terminals belonging to other operators among the resource amounts held by the host operator (that is, fixed proportional exchange rule, a one-to-one relationship in the present embodiment).

By so doing, according to the present embodiment, when a network sharing technique is applied to a picocell, each operator can increase the gain (throughput) of the host operator while allocating resources to terminals belonging to other operators. The only information disclosed by the operator to the manager is the resource amount ($q_{ij}^*$) in which the gain in the gain function of the operator becomes a maximum, and it is not necessary to indicate other detailed information, the number of terminals connected to the operator or protected resource amounts. Thus, although each operator can make false declaration about the resource amount ($q_{ij}^*$) corresponding to a maximum gain, the gain is not improved by false declaration and there is no motive for each operator to make false declaration, which thus simplifies system design. That is, when a network sharing technique is applied to a picocell, it is possible to appropriately adjust the use of the picocell among a plurality of operators while satisfying individual rationality and strategy proof.

In the present embodiment, a resource amount of the picocell shared among operators may be adjusted based on the ratio of resources. The gain function of operator 1 based on the ratio of resources is expressed by equation 6. In addition, $qr_{12}$ in equation 6 denotes the ratio of resources allocated to a terminal belonging to other operator 2 in the resource amount ($R_1$) of operator 1.

(Equation 6)

$$f_1(q_{12}, p_1) = \left(\frac{r_{macro}(R_1(1-qr_{12}))(1-p_1)}{N_1}\right)^{N_1} \cdot$$
$$\left(\frac{(r_{protected}p_1 + r_{n\_protected}(1-p_1))(R_1(1-qr_{12}))}{M_{11}}\right)^{M_{11}} \cdot$$
$$\left(\frac{r_{protected}R_2 q_{21}(=q_{12})}{M_{21}}\right)^{M_{21}} \quad [6]$$

Variation 1

Figure 9:
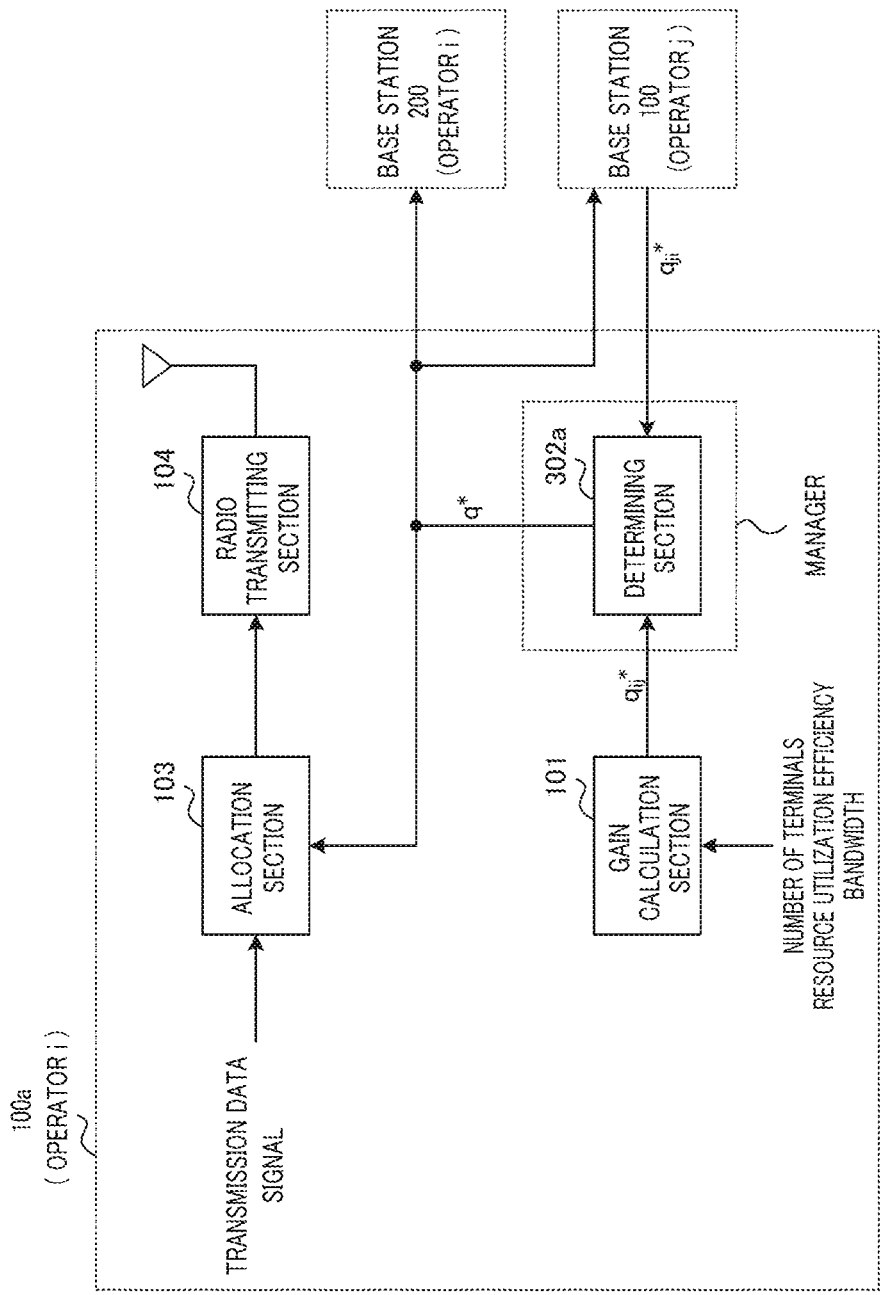
FIG. 9 is a block diagram illustrating another configuration of the base station (macrocell) according to Embodiment 1 of the present invention.

A case has been described in the present embodiment where manager 300 other than a communication apparatus (base station 100) belonging to each operator is provided separately. However, a communication apparatus belonging to any one of the operators may be provided with functions similar to those of manager 300 instead of manager 300. For example, a case will be described where the macrocell of operator i is provided with a role similar to that of manager 300. FIG. 9 is a block diagram illustrating a configuration of base station 100a (macrocell) of operator i.

Determining section 302a of base station 100a receives resource amount $q_{ij}$* from gain calculation section 101 and also receives resource amount $q_{ji}$* from base station 100 (macrocell) of other operator j via, for example, an X2 interface or S1 interface. Determining section 302a determines a minimum value of $q_{ij}$* and $q_{ji}$* as resource amount q*. Determining section 302a transmits determined resource amount q* to base station 100 of operator j and base station 200 of operator i, and also outputs resource amount q* to allocation section 103. Determining section 302a is connected to gain calculation section 101 and allocation section 103 via an interface in base station 100a and each parameter is indicated thereto.

Figure 10:
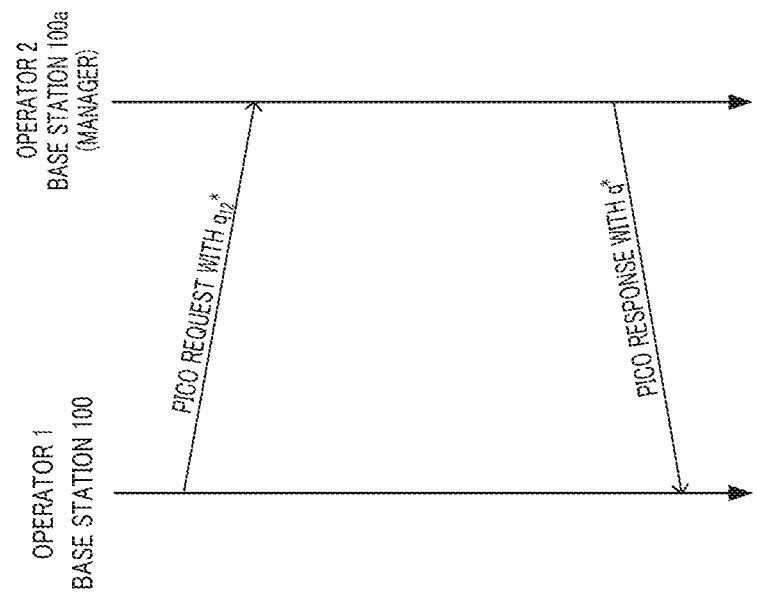
FIG. 10 illustrates another example of signaling according to Embodiment 1 of the present invention.

FIG. 10 illustrates transmission and reception of signaling between operators according to variation 1. FIG. 10 illustrates a case where a request for sharing a picocell is exchanged between base station 100 of operator 1 and base station 100a of operator 2 (manager).

(Step 1)
Base station 100 of operator 1 determines whether or not to share a picocell with another operator (operator 2). Alternatively, base station 100 of operator 1 determines whether or not to update a request (request for sharing the picocell) already indicated to base station 100a of operator 2 having a manager function.

(Step 2)
In step 1, when base station 100 of operator 1 determines to share the picocell with operator 2 or determines to update a request already indicated to base station 100a of operator 2, base station 100 of operator 1 transmits signaling for requesting sharing of the picocell (Pico Request) to base station 100a of operator 2. In this case, base station 100 of operator 1 includes resource amount $q_{12}$* calculated using the gain function of operator 1 in signaling (Pico Request with $q_{12}$*).

(Step 3)
Upon receiving signaling from base station 100 of operator 1 in step 2, base station 100a of operator 2 determines resource amount q* using resource amount $q_{21}$* calculated by base station 100a of operator 2 and resource amount $q_{12}$* included in the signaling received in step 2 based on the aforementioned method.

(Step 4)
Base station 100a of operator 2 transmits signaling (Pico Response with q*) for starting/updating sharing of the picocell including resource amount q* (resource sharing information) determined in step 3 to base station 100 of operator 1.

By this means, even when any one operator is provided with functions similar to those of manager 300 without being provided with manager 300, it is possible to appropriately adjust the use of the picocell among a plurality of operators and improve frequency utilization efficiency as in the case of the above embodiment.

Variation 2

A case has been described in the present embodiment where a macrocell and a picocell are operated in the same frequency band (e.g., see FIG. 1A). However, a method similar to that in the above-described embodiment is also applicable to a case where a macrocell and a picocell are operated in different frequency bands (e.g., see FIG. 11).

When the frequency band differs between the macrocell and the picocell, there is no interference from the macrocell to the picocell. Thus, there is no need to consider the protected resources and non-protected resources shown in FIG. 1B or equation 2 or equation 3.

Thus, in the case of variation 2, gain function $f_1$ of operator 1 and gain function $f_2$ of operator 2 are defined in equation 7 and equation 8 respectively. Here, also suppose that an identical resource amount ($q_{12}=q_{21}$) is secured for each operator to allocate resources to terminals belonging to other operators.

(Equation 7)

$$f_1(q_{12}) = \left(\frac{r_{pico}(R_1 - q_{12})}{M_{11}}\right)^{M_{11}} \cdot \left(\frac{r_{pico}q_{21}(=q_{12})}{M_{21}}\right)^{M_{21}} \quad [7]$$
$$= (R_1 - q_{12})^{M_{11}} q_{21}(=q_{12})^{M_{21}} g_1(\,)$$

(Equation 8)

$$f_2(q_{21}) = \left(\frac{r_{pico}(R_2 - q_{21})}{M_{11}}\right)^{M_{22}} \cdot \left(\frac{r_{pico}q_{12}(=q_{21})}{M_{21}}\right)^{M_{12}} \quad [8]$$
$$= (R_2 - q_{21})^{M_{22}} q_{12}(=q_{21})^{M_{12}} g_2(\,)$$

In equation 7 and equation 8, $r_{pico}$ denotes average resource utilization efficiency in the picocell.

The gain functions shown in equation 7 and equation 8 are also functions having only one local maximum value in a range of $0 \leq q_{ij} < R_i$ as with equation 2 and equation 3. Therefore, the same operation as that of the aforementioned method may be applied using equation 7 and equation 8. That is, each operator (base station 100) declares $q_{ij}$* corresponding to the local maximum values of the gain functions shown in equation 7 and equation 8 to manager 300. Next, manager 300 determines a minimum value of $q_{ij}$* of the operators as resource amount q*. Each operator may then allocate the resource of resource amount q* to terminals belonging to other operators.

Embodiment 2

A case has been described in Embodiment 1 where each operator adjusts the resource amounts allocated to terminals belonging to the other operators. In contrast, the present embodiment will describe a case of adjusting the number of terminals belonging to other operators that share a picocell belonging to each operator (the number of accepted terminals belonging to other operators at each operator (the number of accepted terminals)).

Since a base station and a manager according to the present embodiment have basic configurations common to those of base station 100, base station 200 and manager 300 according to Embodiment 1, these apparatuses will be described using FIG. 2 to FIG. 6.

That is, in the main configuration (FIG. 2) of base station 100 according to the present embodiment, gain calculation section 101 calculates a second number of terminals corresponding to a maximum gain in a gain function of the host operator using a function (gain function) using as a variable, a first number of terminals connected to a picocell belonging to other operators among terminals belonging to the host operator to which base station 100 belongs. Transmitting and receiving section 102 transmits the second number of terminals to manager 300 and receives a minimum value of a plurality of the second numbers of terminals calculated in each of a plurality of operators from manager 300. Allocation section 103 allocates resources to signals of terminals belonging to the host operator and signals of terminals belonging to other operators based on a minimum value of the plurality of the second numbers of terminals.

In the main configuration (FIG. 3) of manager 300 according to the present embodiment, transmitting and receiving section 301 receives the second numbers of terminals corresponding to a maximum gain in the function (gain function) using as a variable, the first number of terminals connected to a picocell belonging to other operators among terminals belonging to the own operator from the plurality of operators. Determining section 302 determines a minimum value of the plurality of the second numbers of terminals received from each of the plurality of operators. Transmitting and receiving section 302 transmits a minimum value of the above-described plurality of the second numbers of terminals to the plurality of operators.

Note that the above-described gain function is a function common among the plurality of operators indicating each gain of the plurality of operators sharing each picocell belonging to a region of a corresponding one of macrocells covered by the plurality of operators and has only one extreme value. In the above-described gain function, a third number of terminals belonging to other operators connected the picocell belonging to the host operator and the above-described first number of terminals have a proportional relationship.

A case will be described as an example below where two operators of operator 1 and operator 2 share a picocell.

In the present embodiment, each operator sets the numbers of accepted terminals to an identical value ($M_{12}=M_{21}$). That is, the ratio between the number of terminals belonging to other operators connected to a picocell belonging to the host operator and the number of terminals belonging to the host operator connected to the picocell belonging to other operators (exchange rate between operators) is one-to-one (identical number).

Gain function $f_1$ of operator 1 and gain function $f_2$ of operator 2 according to the present embodiment will be described.

Equation 9 and equation 10 express gain functions of the respective operators when interference from the macrocell (base station 100) to the picocell (base station 200) occurs (e.g., see FIG. 1A).

(Equation 9)

$$f_1(M_{21}) = \left(\frac{r_{macro}(R_1 - q_{12})(1-p_1)}{L_1 - M_{21}}\right)^{L_1-M_{21}} \cdot \left(\frac{(r_{protected}p_1 + r_{n\_protected}(1-p_1))(R_1 - q_{12})}{M_{11}}\right)^{M_{11}} \cdot \left(\frac{r_{protected}q_{21}(=q_{12})}{M_{21}}\right)^{M_{21}}$$  [9]

(Equation 10)

$$f_2(M_{12}) = \left(\frac{r_{macro}(R_2 - q_{21})(1-p_2)}{L_2 - M_{12}}\right)^{L_2-M_{12}} \cdot \left(\frac{(r_{protected}p_2 + r_{n\_protected}(1-p_2))(R_2 - q_{21})}{M_{22}}\right)^{M_{22}} \cdot \left(\frac{r_{protected}q_{12}(=q_{21})}{M_{12}}\right)^{M_{12}}$$  [10]

Figure 11A:
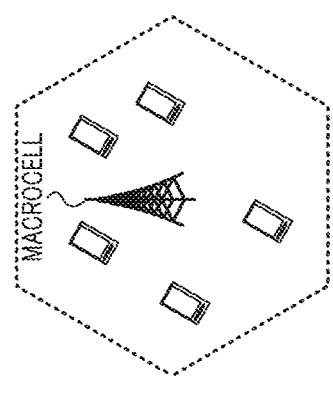
FIGS. 11A to 11C illustrate variations of a system according to Embodiment 1 of the present invention.
Figure 11B:
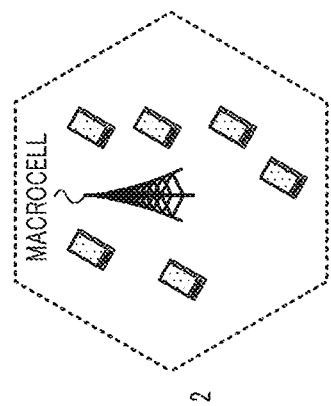
Figure 11C:
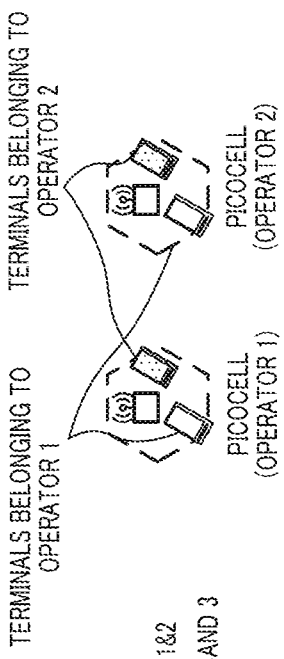

Meanwhile, equation 11 and equation 12 express gain functions of the respective operators when interference from the macrocell (base station 100) to the picocell (base station 200) does not occur (e.g., see FIGS. 11A to 11C).

(Equation 11)

$$f_1(M_{21}) = \left(\frac{r_{macro}(R_1)}{L_1 - M_{21}}\right)^{L_1-M_{21}} \cdot \left(\frac{r_{pico}(R_1 - q_{12})}{M_{11}}\right)^{M_{11}} \cdot \left(\frac{r_{pico}q_{21}(=q_{12})}{M_{21}}\right)^{M_{21}}$$  [11]

(Equation 12)

$$f_2(M_{12}) = \left(\frac{r_{macro}(R_2)}{L_2 - M_{12}}\right)^{L_2-M_{12}} \cdot \left(\frac{r_{pico}(R_2 - q_{21})}{M_{22}}\right)^{M_{22}} \cdot \left(\frac{r_{pico}q_{12}(=q_{21})}{M_{12}}\right)^{M_{12}}$$  [12]

In equation 9 to equation 12, $L_i=N_i+M_{ji}$ which indicates the number of terminals belonging to operator i. Note that $N_i$ denotes the number of terminals connected to a macrocell of operator i of the terminals belonging to operator i and $M_{ji}$ denotes the number of terminals connected to a picocell of operator j of terminals belonging to operator i. Furthermore, $q_{ij}=M_{ji}*K$. K is a constant which indicates a resource amount allocated to the terminal when the terminal is connected to another operator. That is, K denotes a resource amount guaranteed per terminal connected to a picocell belonging to the other operator in the calculation of a gain function. For example, in actual operation, K or more resources may be allocated to per terminal according to a traffic situation.

Thus, the gain function according to the present embodiment uses as one variable, the number of terminals (the number of accepted terminals) $M_{ji}$ connected to a picocell belonging to the other operators among terminals belonging to a plurality of operators. In the gain function, resource amount $q_{ij}$ allocated to terminals belonging to other operators is defined by the product $M_{ji}*K$ of $M_{ji}$ and K. Setting $M_{21}=M_{12}$ is equivalent to setting $q_{12}=q_{21}$ as shown in equation 9 to equation 12. The gain function according to the present embodiment is common among operators sharing the picocell as in the case of Embodiment 1 and is defined by parameters for each operator (the number of terminals, frequency utilization efficiency, bandwidth or the like).

In the present embodiment, for a terminal that has not been accepted by other operators, its gain function is designed so that the terminal may be connected to the macrocell of the host operator. More specifically, in the denominator of the first term on the right side of equation 9 to equation 12, a number ($L_i$–$M_{ji}$) obtained by subtracting $M_{ji}$ (the number of terminals actually connected to the picocell of operator j of terminals belonging to operator i) from $L_i$ (the number of terminals belonging to operator i) represents the number of terminals connected to the macrocell of operator i including the terminal that has not been accepted by other operators. When a negotiation between operators is broken down, this can prevent terminals from being not allocated to any resources even when the terminals are connected to other operators. Details of the method of grasping the number of terminals $M_{ji}$ will be described later.

By setting $M_{12}$=$M_{21}$, the gain functions shown in equation 9 to equation 12 become functions that have only one local maximum value in operator 1 and operator 2. Hereinafter, the solution for maximizing the gain functions shown in equation 9 and equation 11 of operator 1 is represented by $M_{21}*$ and the solution for maximizing the gain functions shown in equation 10 and equation 12 of operator 2 is represented by $M_{12}*$.

That is, gain calculation section 101 of base station 100 according to the present embodiment calculates, for each operator, the number of terminals ($M_{ji}*$ in operator i) belonging to the host operator connected to the picocell belonging to other operators corresponding to a maximum gain function of each operator. More specifically, when interference from the macrocell (base station 100) to the picocell (base station 200) occurs (e.g., see FIG. 1A), gain calculation section 101 of base station 100 in operators 1 and 2 calculates $M_{21}*$ and $M_{12}*$ that maximize the gain function based on equation 13 and equation 14.

(Equation 13)

$$\max_{M_{21}} f_1(M_{21}) = \max_{M_{21}} \left(\frac{r_{macro}(R_1 - q_{12})(1 - p_1)}{L_1 - M_{21}}\right)^{L_1 - M_{21}} \cdot \quad [13]$$

$$\left(\frac{(r_{protected}p_1 + r_{n\_protected}(1 - p_1))(R_1 - q_{12})}{M_{11}}\right)^{M_{11}} \cdot$$

$$\left(\frac{r_{protected}q_{21}(=q_{12})}{M_{21}}\right)^{M_{21}}$$

(Equation 14)

$$\max_{M_{12}} f_2(M_{12}) = \max_{M_{12}} \left(\frac{r_{macro}(R_2 - q_{21})(1 - p_2)}{L_2 - M_{12}}\right)^{L_2 - M_{12}} \cdot \quad [14]$$

$$\left(\frac{(r_{protected}p_2 + r_{n\_protected}(1 - p_2))(R_2 - q_{21})}{M_{11}}\right)^{M_{22}} \cdot$$

$$\left(\frac{r_{protected}q_{12}(=q_{21})}{M_{12}}\right)^{M_{12}}$$

When no interference from the macrocell (base station 100) to the picocell (base station 200) occurs (e.g., see FIGS. 11A to 11C), gain calculation section 101 of base station 100 of operator 1 or 2 calculates $M_{21}*$ and $M_{12}*$ corresponding to a maximum gain function based on equation 15 and equation 16 respectively.

(Equation 15)

$$\max_{M_{21}} f_1(M_{21}) = \max_{M_{21}} \left(\frac{r_{macro}(R_1)}{L_1 - M_{21}}\right)^{L_1 - M_{21}} \cdot \quad [15]$$

$$\left(\frac{r_{pico}(R_1 - q_{12})}{M_{11}}\right)^{M_{11}} \cdot \left(\frac{r_{pico}q_{21}(=q_{12})}{M_{21}}\right)^{M_{21}}$$

(Equation 16)

$$\max_{M_{12}} f_2(M_{12}) = \max_{M_{12}} \left(\frac{r_{macro}(R_2)}{L_2 - M_{12}}\right)^{L_2 - M_{12}} \cdot \quad [16]$$

$$\left(\frac{r_{pico}(R_2 - q_{21})}{M_{22}}\right)^{M_{22}} \cdot \left(\frac{r_{pico}q_{12}(=q_{21})}{M_{12}}\right)^{M_{12}}$$

Manager 300 determines a minimum value of $M_{ji}*$ (here, $M_{21}*$ and $M_{12}*$) received from base station 100 of each operator as the number of terminals (number of accepted terminals) M* belonging to other operators connected a picocell belonging to each operator common to respective operators sharing the picocells among operators. That is, manager 300 adjusts the number of terminals (that is, resource amounts) so as to secure the same number of accepted terminals ($M_{21}$=$M_{12}$=M*) in each operator. Manager 300 indicates the determined number of terminals M* as a report value (resource sharing information) to base station 100 of each operator.

Base station 100 (allocation section 103) of each operator allocates resources to terminals belonging to the own operator based on M* received from manager 300. Base station 200 (allocation section 202) of each operator allocates resources to terminals belonging to the own operator based on M* received via base station 100 and also allocates resources to terminals belonging to other operators.

That is, the present embodiment can realize operation similar to that of Embodiment 1 by substituting q (resource amount) in Embodiment 1 by M (the number of terminals).

Method of Knowing Number of Terminals Connected to Other Operators

Next, the method of knowing the number of terminals $M_{ji}$ connected to other operators among terminals belonging to the own operator will be described. In the following description, the number of terminals $M_{21}$ of operator 1 connected to a picocell belonging to operator 2 will be described as an example.

<Premise>

As a premise, in order for the terminal of operator 1 to connect to a picocell belonging to operator 2, the terminal needs to perform handover from the base station of operator 1 (that is, base station of the operator to which the terminal belongs). That is, the terminal cannot directly connect to the picocell belonging to operator 2.

<Counting Number of Terminals>

Regarding terminals belonging to operator 1 connected to operator 2, the following numbers of terminals are counted.

M21_A: The number of terminals handed over from operator 1 to a picocell belonging to operator 2

M21_B: The number of terminals handed over to and returned from a picocell belonging to operator 2

M21_C: The number of terminals whose connection is released from a picocell belonging to operator 2 (the number of idle terminals).

As the method of knowing that a connection is released from the picocell belonging to operator 2, the following two methods (options1 and 2) are considered, for example.

(Option 1)

One of the methods is to send indication from the picocell belonging to operator 2 (base station 200) to the macrocell (base station 100) of operator 1.

(Option 2)

The other is a method whereby when a terminal caused by the macrocell (base station 100) of operator 1 to hand over to a picocell (base station 200) belonging to operator 2 is indicated from base station 100 of operator 1 to an MME, and when the terminal becomes idle, the MME indicates the idle terminal to base station 100 of operator 1. The MME knows the terminal in an idle state through Tracking Area Update transmitted to the MME when the terminal is connected in the idle state.

This is determined from the number of terminals of operator 1 actually connected to operator 2 $M_{21}$=M21_A−(M21_B+M21_C).

Method for Each Operator to Know Whether or not Other Operator has Shared Picocell Base station 100 of each operator indicates, to manager 300, a shared pico list showing a list of picocells shared by the own operator. The shared pico list may be transmitted together with signaling that requests sharing of a picocell, for example. Manager 300 indicates the shared pico list indicated from each operator to base station 100 of each operator. This shared pico list may be transmitted together with signaling indicating a start/update of sharing of the picocell. By so doing, each operator can identify the existence of a picocell shared by other operators.

By this means, in the present embodiment, base station 100 of each operator calculates the number of terminals ($M_{ji}$*) corresponding to a maximum gain in the gain function of the own operator using a gain function ($f_i$) that uses as a variable, the number of terminals ($M_{ji}$) connected to a picocell belonging to another operator (operator j) of terminals belonging to the own operator (operator i) to which base station 100 belongs. Base station 100 then allocates resources to signals of terminals belonging to the host operator and terminals belonging to the other operator based on a minimum value (M*) of a plurality of the number of terminals ($M_{ji}$*) calculated in each of a plurality of operators.

By so doing, according to the present embodiment as in the case of Embodiment 1, when a network sharing technique is applied to a picocell, it is possible to appropriately adjust the use of the picocell among a plurality of operators.

Moreover, the gain function in the present embodiment is a function representing each gain of a plurality of operators sharing each picocell and common among the plurality of operators, and has only one extreme value (one local maximum value). In addition, in the gain function, the number of terminals belonging to other operators connected to the picocell belonging to the own operator satisfies a proportional relationship (that is, fixed proportional exchange rule, a one-to-one relationship in the present embodiment) with the number of terminals belonging to the own operator connected to a picocell belonging to another operator.

By so doing, according to the present embodiment, as in the case of Embodiment 1, when a network sharing technique is applied to a picocell, each operator can increase the gain (throughput) of the own operator while allocating resources to terminals belonging to the other operator. Moreover, since there is no motive for false declaration in each operator, the system design becomes easier. That is, when a network sharing technique is applied to a picocell, it is possible to appropriately adjust the use of the picocell among a plurality of operators while satisfying individual rationality and strategy proof.

The embodiment of the present invention has been described so far.

OTHER EMBODIMENTS

Figure 12A:
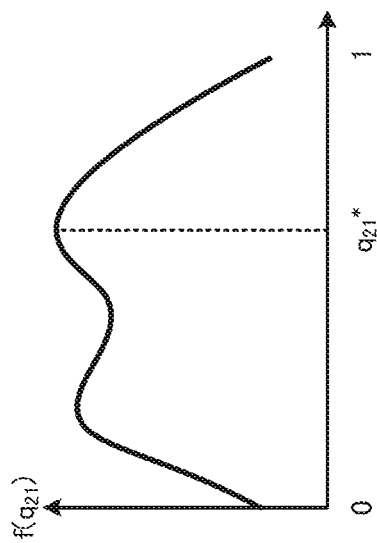
FIGS. 12A and 12B each illustrate a variation of a gain function of each operator according to another embodiment of the present invention.
Figure 12B:
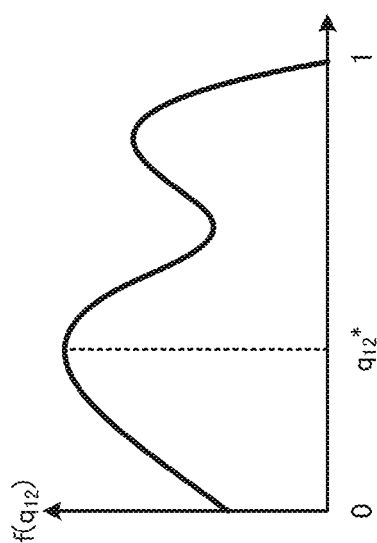

A case has been described in the above embodiment where the gain function has only one extreme value (that is, one local maximum value). However, the number of extreme values of the gain function is not limited to one, and any gain function whose gain does not fall below the gain of $q_{ij}$=0 from $q_{ij}$=0 when no resources are allocated to other operators to $q_{ij}$* when the gain function has a maximum value can satisfy individual rationality. Therefore, the gain function may have at least two extreme values. For example, FIGS. 12A and 12B show examples of a gain function having two extreme values. FIG. 12A shows gain function $f_1$ of operator 1 and FIG. 12B shows gain function $f_2$ of operator 2. As examples, FIGS. 12A and 12B show a relationship between resource amount $q_{ij}$ and gain $f_i(q_{ij})$ as in the case of Embodiment 1 (FIG. 7).

Even when a gain function has two extreme values, base station 100 of each operator as in the case of the above embodiment, calculates a resource amount corresponding to a maximum gain in the gain function of the host operator. That is, in FIG. 12A, base station 100 of operator 1 obtains resource amount $q_{12}$* corresponding to the greater one of the two extreme values (that is, local maximum value). Similarly, in FIG. 12B, base station 100 of operator 2 obtains resource amount $q_{21}$* corresponding to the greater one of the two extreme values (that is, local maximum value). Base station 100 of each operator transmits resource amount $q_{ij}$* obtained to manager 300. Manager 300 determines a minimum value (resource amount q*) of the plurality of resource amounts $q_{ij}$* received from each operator as in the case of the above embodiment. For example, in FIG. 12A and FIG. 12B, if $q_{12}$*<$q_{21}$*, manager 300 selects $q_{12}$* obtained in operator 1 as resource amount q*. Base station 100 of each operator allocates resources to signals of terminals belonging to the own operator and terminals belonging to the other operators based on resource amount q* indicated from manager 300.

As shown in FIG. 12A and FIG. 12B, the gain (throughput or the like) corresponding to resource amount $q_{ij}$* indicated to manager 300 by base station 100 of each operator is higher than the gain when operator i does not participate in the system ($q_{ij}$=0) as in the case of FIG. 7A and FIG. 7B. Thus, in this case, each operator can also increase the gain (throughput) of the host operator while allocating resources to terminals belonging to other operators as in the case of the above embodiment. That is, even when the gain function has at least two extreme values, it is also possible to appropriately adjust the use of a picocell among a plurality of operators while satisfying individual rationality as in the case of the above embodiment in a case where a network sharing technique is applied to a picocell.

A case has been described in the above embodiment as an example where an X2 interface or S1 interface is used to exchange information relating to sharing a picocell, but a new interface may also be provided without being limited to the X2 interface or S1 interface.

A case has been described in the above embodiment where the ratio (exchange rate) of parameters (resource amount or the number of terminals) relating to sharing of a picocell in the gain function between operators is one-to-one (that is, ($q_{ij}$=$q_{ji}$) or ($M_{ij}$=$M_{ji}$)). However, in the gain function, the exchange rate relating to sharing of a picocell between operators is not limited to one-to-one. For example, between operator i and operator j, the ratio may be ($q_{ij}=3q_{ji}$) (exchange rate: 1:3) or ($M_{ij}=2M_{ji}$) (exchange rate: 1:2). For example, when a frequency bandwidth or the average number of terminals is different between the operators, the exchange rate (ratio of $q_{ij}$ or $M_{ij}$ between operators) may be adjusted in advance depending on the difference in the frequency bandwidth or the average number of terminals. That is, a proportional relationship (that is, fixed proportional exchange rule) may be satisfied in the gain function between the resource amount allocated to terminals belonging to the host operator of the resource amounts held by other operators and the resource amount allocated to terminals belonging to other operators of the resource amount of the host operator or between the number of terminals belonging to other operators connected to a picocell belonging to the own operator and the number of terminals belonging to the own operator connected a picocell belonging to another operator. Each operator may allocate resources to a signal intended for each terminal according to the same rate as the exchange rate in the gain function using q* or M* determined based on $q_{ji}^*$ or $M_{ji}^*$ corresponding to a maximum gain in the above gain function. For example, between operators whose exchange rate is 1:3, one operator may allocate resource based on q* or M*, and the other operator may allocate resources based on 3q* or 3M*.

A case has been described in the above embodiment where the service area (coverage area) of a macrocell overlaps with the service area of a picocell. However, a method similar to that in the case of the above embodiment may also apply to a case where service areas overlap between macrocells or between picocells.

A case has been described in the present embodiment where base station 100 (FIG. 4) which is a macrocell is provided with gain calculation section 101 for base station 100 to perform exchange relating to sharing of a picocell with manager 300 (FIG. 6). However, without being limited to this, base station 200 (FIG. 5) which is a picocell may be provided with gain calculation section 101 for base station 200 to perform exchange relating to sharing of a picocell with manager 300. In this case, base station 200 (picocell) may indicate a report value (resource amount or the number of terminals) indicated from manager 300 to base station 100 (macrocell). Alternatively, an apparatus (not shown) in an operator other than the macrocell (base station 100) and the picocell (base station 200) may be provided with gain calculation section 101 and the apparatus may perform communication relating to sharing of the picocell with manager 300.

For the frequency utilization efficiency (resource utilization efficiency) used in the gain function, an average value of frequency utilization efficiency between the base station and the terminal may be used. Alternatively, for the frequency utilization efficiency, a value may be used which is estimated from other parameters such as RSRP (Reference Signal Reception Power), SNR (Signal to Noise Ratio), SIR (Signal to Interference Ratio), SINR (Signal to Interference and Noise Ratio), CIR (Carrier to Interference Ratio), CNR (Carrier to Noise Ratio), CINR (Carrier to Interference and Noise Ratio), RSSI (Received Signal Strength Indicator), RSRP (Reference Signal Reception Power), RSRQ (Reference Signal Received Quality), MCS (Modulation and Coding Scheme) level, receiving power, interference power, error rate, or transmission rate.

Although each embodiment has been described with examples where the present invention is configured by hardware, the present invention can also be implemented by software in concert with hardware.

Each function block employed in the description of the aforementioned embodiments may typically be implemented as an LSI constituted by an integrated circuit. These functional blocks may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI as a result of the advancement of semiconductor technology or a technology derivative of semiconductor technology, it is naturally also possible to carry out function block integration using this technology. Application of biotechnology is also possible.

As has been described above, the communication apparatus according to this disclosure includes: a calculation section that calculates, using a function that uses a first resource amount or a first number of terminals as a variable, a second resource amount corresponding to a maximum gain in the function of an operator to which the communication apparatus belongs or a second number of terminals corresponding to the maximum gain in the function of the operator, the first resource amount being a resource amount allocated from among a resource amount held by the operator to a terminal belonging to another operator, the first number of terminals being a number of terminals connected to a picocell belonging to the other operator among terminals belonging to the operator of the communication apparatus; a transmitting and receiving section that transmits the second resource amount or the second number of terminals to a management apparatus and that receives, from the management apparatus, a minimum value of a plurality of the second resource amounts or a minimum value of a plurality of the second numbers of terminals calculated in each of a plurality of operators; and an allocation section that allocates a resource to a signal of the terminal belonging to the operator and the terminal belonging to the other operator based on the minimum value of the plurality of second resource amounts or the minimum value of the plurality of the second numbers of terminals.

In addition, in the communication apparatus according to the present disclosure, the function is a function that indicates a gain of each of the plurality of operators sharing each picocell belonging to a region of a corresponding one of macrocells covered by the plurality of operators and that is common among the plurality of operators, the function having at least two extreme values and satisfying a proportional relationship between a third resource amount allocated to a terminal belonging to the operator among the resource amount held by the other operator and the first resource amount or between a third number of terminals belonging to the other operator connected to the picocell belonging to the operator and the first number of terminals.

Moreover, in the communication apparatus according to the present disclosure, the function is a function that indicates a gain of each of the plurality of operators sharing each picocell belonging to a region of a corresponding one of macrocells covered by the plurality of operators and that is common among the plurality of operators, the function having only one extreme value and satisfying a proportional relationship between a third resource amount allocated to a terminal belonging to the operator among the resource amount held by the other operator and the first resource amount or between a third number of terminals belonging to the other operator connected to the picocell belonging to the operator and the first number of terminals.

Furthermore, in the communication apparatus according to the present disclosure, in the function, the first resource amount and the third resource amount, or the first number of terminals and the third number of terminals are identical.

In the communication apparatus according to the present disclosure, in the function, a ratio between the first resource amount and the third resource amount, or a ratio between the first number of terminals and the third number of terminals is determined in accordance with an average number of terminals or a frequency bandwidth in each of the plurality of operators.

In the communication apparatus according to the present disclosure, the first resource amount is defined by a product of a constant indicating a minimum value of the resource amounts allocated to terminals belonging to the other operator and the first number of terminals.

Moreover, the management apparatus according to the present disclosure includes: a receiving section that receives, from each of a plurality of operators, in a function that uses a first resource amount or a first number of terminals as a variable, a second resource amount corresponding to a maximum gain in the function, or a second number of terminals corresponding to the maximum gain in the function, the first resource amount being a resource amount allocated from among a resource amount held by the operator to a terminal belonging to another operator, the first number of terminals being a number of terminals connected to a picocell belonging to the other operator among terminals belonging to the operator; a determining section that determines a minimum value of a plurality of the second resource amounts or a minimum value of a plurality of the second the numbers of terminals received from each of the plurality of operators; and a transmitting section that transmits a minimum value of the plurality of second resource amounts or a minimum value of the plurality of the second numbers of terminals to the plurality of operators.

Moreover, in the management apparatus according to this disclosure, the function is a function that indicates a gain of each of the plurality of operators sharing each picocell belonging to a region of a corresponding one of macrocells covered by the plurality of operators and that is common among the plurality of operators, the function having at least two extreme values and satisfying a proportional relationship between a third resource amount allocated to a terminal belonging to the operator among the resource amount held by the other operator and the first resource amount or between a third number of terminals belonging to the other operator connected to the picocell belonging to the operator and the first number of terminals.

Furthermore, in the management apparatus according to the present disclosure, the function is a function that indicates a gain of each of the plurality of operators sharing each picocell belonging to a region of a corresponding one of macrocells covered by the plurality of operators and that is common among the plurality of operators, the function having only one extreme value and satisfying a proportional relationship between a third resource amount allocated to a terminal belonging to the operator among the resource amount held by the other operator and the first resource amount or between a third number of terminals belonging to the other operator connected to the picocell belonging to the operator and the first number of terminals.

In the management apparatus according to the present disclosure, in the function, the first resource amount and the third resource amount, or the first number of terminals and the third number of terminals are identical.

In the management apparatus according to the present disclosure, in the function, a ratio between the first resource amount and the third resource amount, or a ratio between the first number of terminals and the third number of terminals is determined in accordance with an average number of terminals or a frequency bandwidth in each of the plurality of operators.

In the management apparatus according to the present disclosure, the first resource amount is defined by a product of a constant indicating a minimum value of the resource amounts allocated to terminals belonging to the other operator and the first number of terminals.

Moreover, the resource allocation method according to the present disclosure includes: calculating, using a function that uses a first resource amount or a first number of terminals as a variable, a second resource amount corresponding to a maximum gain in the function of an operator or a second number of terminals corresponding to the maximum gain in the function of the operator, the first resource amount being a resource amount allocated from among a resource amount held by the operator to a terminal belonging to another operator, the first number of terminals being a number of terminals connected to a picocell belonging to the other operator among terminals belonging to the operator;

transmitting the second resource amount or the second number of terminals to a management apparatus and receiving a minimum value of a plurality of the second resource amounts or a minimum value of a plurality of the second numbers of terminals calculated in each of a plurality of operators from the management apparatus; and allocating a resource to a signal of the terminal belonging to the operator and the terminal belonging to the other operator based on the minimum value of the plurality of second resource amounts or the minimum value of the plurality of the second numbers of terminals.

The resource determination method according to the present disclosure includes: receiving, from each of a plurality of operators, in a function that uses a first resource amount or a first number of terminals as a variable, a second resource amount corresponding to a maximum gain in the function or a second number of terminals corresponding to the maximum gain in the function, the first resource amount being a resource amount allocated from among a resource amount held by the operator to a terminal belonging to another operator, the first number of terminals being a number of terminals connected to a picocell belonging to the other operator among terminals belonging to the operator; determining a minimum value of a plurality of the second resource amounts or a minimum value of a plurality of the second numbers of terminals received from each of the plurality of operators; and transmitting a minimum value of the plurality of second resource amounts or a minimum value of the plurality of the second numbers of terminals to the plurality of operators.

The disclosure of Japanese Patent Application No. 2012-223117, filed on Oct. 5, 2012, including the specification, drawings and abstract is incorporated herein by reference in its entirety.

INDUSTRIAL APPLICABILITY

The present invention is useful in making it possible to appropriately adjust the use of a picocell among a plurality of operators even when network sharing is applied to the picocell.

REFERENCE SIGNS LIST 100, 100a, 200 Base station
300 Manager
101 Gain calculation section
102, 301 Transmitting and receiving section
103, 202 Allocation section
104, 203 Radio transmitting section
201 Receiving section
302, 302a Determining section

The invention claimed is:

1. A communication apparatus comprising:
calculation circuitry that calculates, using a function that uses a first frequency bandwidth amount or a first number of terminals as a variable, a second frequency bandwidth amount corresponding to an extreme value in the function of an operator to which the communication apparatus belongs or a second number of terminals corresponding to the an extreme value in the function of the operator, the first frequency bandwidth amount being a frequency bandwidth amount allocated from among a frequency bandwidth amount held by the operator to a terminal belonging to another operator, the first number of terminals being a number of terminals connected to a picocell belonging to the other operator among terminals belonging to the operator of the communication apparatus;
a transmitter that transmits the second frequency bandwidth amount or the second number of terminals to a management apparatus and that receives, from the management apparatus, a minimum value of a plurality of the second frequency bandwidth amounts or a minimum value of a plurality of the second numbers of terminals calculated in each of a plurality of operators; and
allocation circuitry that allocates a resource to a signal of the terminal belonging to the operator and the terminal belonging to the other operator based on the minimum value of the plurality of second frequency bandwidth amounts or the minimum value of the plurality of the second numbers of terminals.

2. The communication apparatus according to claim 1, wherein the function indicates a throughput of each of the plurality of operators sharing each picocell belonging to a region of a corresponding one of macrocells covered by the plurality of operators, and is common among the plurality of operators, the function having at least two extreme values and satisfying a proportional relationship between a third frequency bandwidth amount allocated to a terminal belonging to the operator among the frequency bandwidth amount held by the other operator and the first frequency bandwidth amount or between a third number of terminals belonging to the other operator connected to the picocell belonging to the operator and the first number of terminals.

3. The communication apparatus according to claim 1, wherein the function indicates a throughput of each of the plurality of operators sharing each picocell belonging to a region of a corresponding one of macrocells covered by the plurality of operators, and is common among the plurality of operators, the function having only one extreme value and satisfying a proportional relationship between a third frequency bandwidth amount allocated to a terminal belonging to the operator among the frequency bandwidth amount held by the other operator and the first frequency bandwidth amount or between a third number of terminals belonging to the other operator connected to the picocell belonging to the operator and the first number of terminals.

4. The communication apparatus according to claim 2, wherein, in the function, the first frequency bandwidth amount and the third frequency bandwidth amount, or the first number of terminals and the third number of terminals are identical.

5. The communication apparatus according to claim 2, wherein, in the function, a ratio between the first frequency bandwidth amount and the third frequency bandwidth amount, or a ratio between the first number of terminals and the third number of terminals is determined in accordance with an average number of terminals or a frequency bandwidth in each of the plurality of operators.

6. The communication apparatus according to claim 1, wherein the first frequency bandwidth amount is defined by a product of a constant indicating a minimum value of the frequency bandwidth amounts allocated to terminals belonging to the other operator and the first number of terminals.

7. A resource allocation method comprising:
calculating, using a function that uses a first frequency bandwidth amount or a first number of terminals as a variable, a second frequency bandwidth amount corresponding to a an extreme value in the function of an operator or a second number of terminals corresponding to the an extreme value in the function of the operator, the first frequency bandwidth amount being a frequency bandwidth amount allocated from among a frequency bandwidth amount held by the operator to a terminal belonging to another operator, the first number of terminals being a number of terminals connected to a picocell belonging to the other operator among terminals belonging to the operator;
transmitting the second frequency bandwidth amount or the second number of terminals to a management apparatus;
receiving a minimum value of a plurality of the second frequency bandwidth amounts or a minimum value of a plurality of the second numbers of terminals calculated in each of a plurality of operators from the management apparatus; and
allocating a resource to a signal of the terminal belonging to the operator and the terminal belonging to the other operator based on the minimum value of the plurality of second frequency bandwidth amounts or the minimum value of the plurality of the second numbers of terminals.

8. A macro cell base station apparatus in a communication system that includes a plurality of macro cell base station apparatuses and a management apparatus, the macro cell base station apparatus comprising:
calculation circuitry that calculates, using a function that uses a first frequency bandwidth amount as a variable, a second frequency bandwidth amount corresponding to a an extreme value in the function of an operator to which the macro cell base station apparatus belongs, the first frequency bandwidth amount being a frequency bandwidth amount allocated from among a frequency bandwidth amount held by the operator to a terminal belonging to another operator;
a transmitter that transmits the second frequency bandwidth amount to the management apparatus and that receives, from the management apparatus, a minimum value of a plurality of the second frequency bandwidth amounts calculated in each of a plurality of operators to which the macro cell base station apparatuses respectively belong; and allocation circuitry that allocates the received minimum value of a plurality of the second frequency bandwidth amounts to the terminal belonging to the other operator and allocates a remaining frequency bandwidth amount to the terminal belonging to the operator, the remaining frequency bandwidth amount being calculated by subtracting the received minimum value of a plurality of the second frequency bandwidth amounts from a frequency bandwidth amount held by the operator.

9. The macro cell base station apparatus according to claim 8, wherein the function indicates a throughput of each of the plurality of operators, and is common among the plurality of operators, the function having at least two extreme values and satisfying a proportional relationship between a third frequency bandwidth amount allocated to a terminal belonging to the operator among the frequency bandwidth amount held by the other operator and the first frequency bandwidth amount.

10. The macro cell base station apparatus according to claim 8, wherein the function indicates a throughput of each of the plurality of operators, and is common among the plurality of operators, the function having only one extreme value and satisfying a proportional relationship between a third frequency bandwidth amount allocated to a terminal belonging to the operator among the frequency bandwidth amount held by the other operator and the first frequency bandwidth amount.

11. The macro cell base station apparatus according to claim 9, wherein, in the function, the first frequency bandwidth amount and the third frequency bandwidth amount are identical.

12. The macro cell base station apparatus according to claim 9, wherein, in the function, a ratio between the first frequency bandwidth amount and the third frequency bandwidth amount is determined in accordance with an average number of terminals or a frequency bandwidth in each of the plurality of operators.

13. The macro cell base station apparatus according to claim 8, wherein the first frequency bandwidth amount is defined by a product of a constant indicating a minimum value of the frequency bandwidth amounts allocated to terminals belonging to the other operator.

14. A resource allocation method performed by a macro cell base station apparatus in a communication system that includes a plurality of macro cell base station apparatuses and a management apparatus, the method comprising:

calculating, using a function that uses a first frequency bandwidth amount as a variable, a second frequency bandwidth amount corresponding to a an extreme value in the function of an operator to which the macro cell base station apparatus belongs, the first frequency bandwidth amount being a frequency bandwidth amount allocated from among a frequency bandwidth amount held by the operator to a terminal belonging to another operator;

transmitting the second frequency bandwidth amount to the management apparatus;

receiving from the management apparatus a minimum value of a plurality of the second frequency bandwidth amounts calculated in each of a plurality of operators to which the macro cell base station apparatuses respectively belong; and allocating the received minimum value of a plurality of the second frequency bandwidth amounts to the terminal belonging to the other operator; and allocating a remaining resource mount to the terminal belonging to the operator, the remaining frequency bandwidth amount being calculated by subtracting the received minimum value of a plurality of the second frequency bandwidth amounts from a frequency bandwidth amount held by the operator.

\* \* \* \* \*